April 28, 1925.

J. H. GRAHAM

PEDAL FOR BICYCLES

Filed June 9, 1924

Inventor:
James H. Graham, by Geo. H. Evans

Att'y.

Patented Apr. 28, 1925.

1,535,601

UNITED STATES PATENT OFFICE.

JAMES H. GRAHAM, OF TORRINGTON, CONNECTICUT.

PEDAL FOR BICYCLES.

Application filed June 9, 1924. Serial No. 718,883.

*To all whom it may concern:*

Be it known that I, JAMES H. GRAHAM, a citizen of the United States, residing at Torrington, in the county of Litchfield and State of Connecticut, have invented certain new and useful Improvements in Pedals for Bicycles, of which the following is a specification.

My invention relates to pedals for bicycles and the like.

The objects of the invention are to provide a simple and effective means of holding the pedal upon its spindle and to form the spindle free from machined cones to thereby save expense in manufacture.

Figure 1:
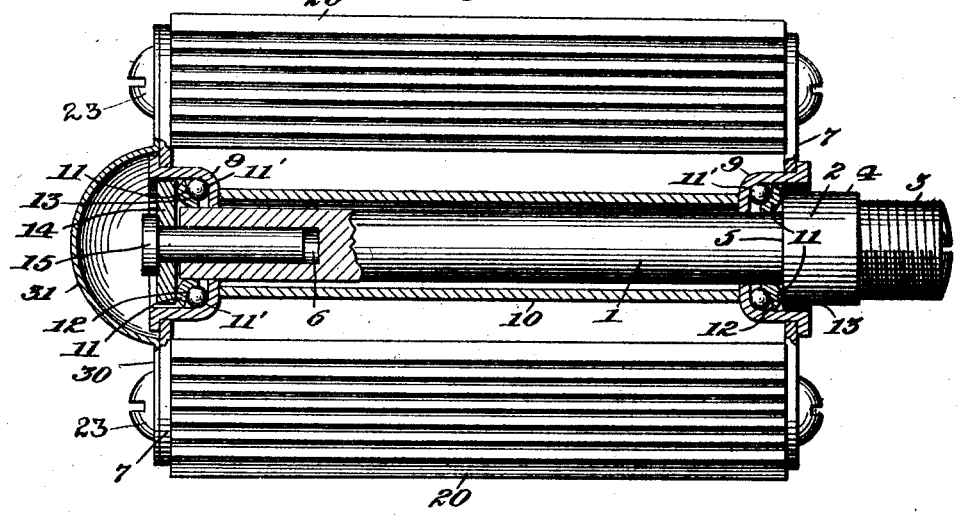
Fig. 1 is a horizontal section through a pedal provided with my improvements.
Figure 2:
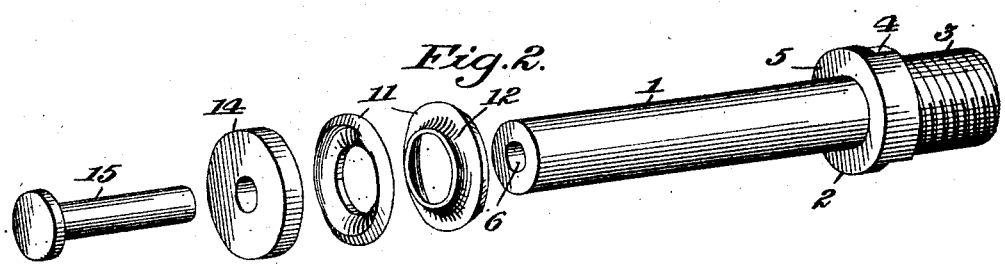
Fig. 2 is a perspective of the pedal spindle, the struck up cones, the friction rivet or headed securing pin and the washer.

The spindle 1 is formed at its inner end with an enlarged annular collar 2, and the usual threaded extremity 3, for connection with a pedal crank. This collar 2 is squared, as at 4, to permit a wrench to grasp and turn the spindle. The inner face 5 of the collar 2 is flat and not formed with a cone in the usual manner so that no machining is necessary. This effects a great saving of expense and the spindle may be drop forged complete and merely threaded, as at 3. The opposite end of the spindle is simply bored to form a longitudinal elongated bore or recess 6 which completes the spindle.

The pedal frame comprises the opposite end plates 7 having the conical cups 9, swaged or formed thereon and these two cups are connected by the spindle inclosing tube 10.

The cones 11, 11 in the cups 9 are struck up from sheet metal and slipped upon the spindle; no machining being required.

The cones 11 are simple disks dished on their outer sides, as at 12, which produces an annular inner ball-engaging channel 13 on the inner side. The outer cone 11 overhangs the outer end of the spindle 1 and against it rests a flat washer 14 loose upon a headed stud or rivet 15. This stud or rivet 15 is of slightly greater diameter than that of the bore or recess 6, so that the stud or rivet will, when driven into said bore 6, remain tightly wedged therein against all ordinary strain and hold the pedal frame in place on the spindle and also hold the cones 11 and the balls 11' in place. By driving the stud or rivet 15 further in to force the washer 14 and outer cone 11 inwardly wear on the balls and cones may be taken up. This headed stud or rivet 15 and bore 6 do away entirely with the steps of reducing and screw threading the end of the spindle and the use of nuts thereon, thus effecting a great saving in the cost of manufacturing and also producing the simplest possible effective retaining means. The pedal bars 20, 20 are secured between the end plates 7, 7 in any desired manner and may be of any suitable construction.

The sheet metal cones 11, 11 are free on the spindle and there is no chance of binding at any point, so that a free turning pedal is the result. It will be seen that the spindle 1 is of the same diameter throughout, that is, from the collar 2 to its outer end, and the two cones 11, 11 are also of the same diameter and the two cups 9, 9 are likewise of the same diameter and connected by a non-tapered tube 10. In manufacturing these parts only one set of dies is necessary to produce the cones 11, 11, and only one set is necessary to produce the cups 9 and standard tubing may be employed for the tube 10, thus effecting a great saving over a construction where cones of different size are employed and a tapering spindle is employed carrying a collar between its ends separate from the one on its threaded attaching end.

In case of necessity therefor, the friction stud or rivet 15 may be forcibly withdrawn.

A guard and dust plate 30 is held removably on the outer fixed end plate 7 by the screws 23, 23 and is cupped between its ends, as at 31, to inclose the outer end of the spindle and outer cup 9.

Various changes may be made in the construction within the scope of my invention.

What I claim is:

1. A pedal for bicycles and the like, comprising a spindle having a longitudinal bore in its outer end, a pedal frame mounted on the spindle, and a headed pin for holding the frame on the axle and of greater diameter than said bore to be held in place by frictional contact when driven into position.

2. A bicycle, or the like, pedal, comprising a spindle having a threaded inner end and formed with an annular shoulder at said inner end, loose cones on the opposite ends of the spindle, the inner one of which engages the inner side of said annular shoulder, a pedal frame mounted on the spindle and having cups facing said separate cones, balls between the cups and cones, a washer at the outer end of the spindle and engaging the outer side of the outer loose cone, and a retaining device at the outer extremity of the spindle and engaging said washer to force it towards said outer cone.

3. A bicycle, or the like, pedal, comprising a spindle having an annular shoulder at its attaching end and a longitudinal bore in its outer end, loose cones mounted on said spindle, the inner cone resting against said annular shoulder and the outer cone being loose at the outer end of said spindle, a pedal frame mounted to turn on the spindle and having inner and outer cups opposed to said loose cones, a washer on the outer end of the spindle, and a headed friction pin driven into said bore with its head engaging the washer.

4. In a bicycle pedal, a spindle formed with a threaded inner end, an annular collar at the inner end of said threaded portion, the outer end having a longitudinal bore, and a pedal-frame-retaining headed pin of somewhat larger diameter than said bore adapted to be driven into and held in said bore by friction.

5. A bicycle pedal or the like, comprising a spindle having an annular shoulder at its attaching end, struck up sheet metal cones mounted loosely on the spindle next to said shoulder and next to the outer end of the spindle; said cones being inclined inwardly from their outer sides to form ball races on their inner sides, a pedal frame mounted on the axle and having cups at its ends opposing said loose cones, balls between the cones and the cups, and means at the outer end of the spindle for retaining the pedal frame thereon.

6. A bicycle pedal comprising a spindle of even diameter throughout, formed at its attaching end with a collar having a flat inner face, two struck up sheet metal cones of the same size loose on the spindle, the inner cone resting against the flat face of said collar, a pedal frame including a straight tube provided at its ends with oppositely facing cups of the same size, balls between the cups and cones, and means at the outer end of the spindle for holding the pedal frame thereon.

In testimony whereof I affix my signature.

JAMES H. GRAHAM.